E. J. MADDEN.
SHAFT COUPLING.
APPLICATION FILED JULY 11, 1914.
1,146,727.
Patented July 13, 1915.
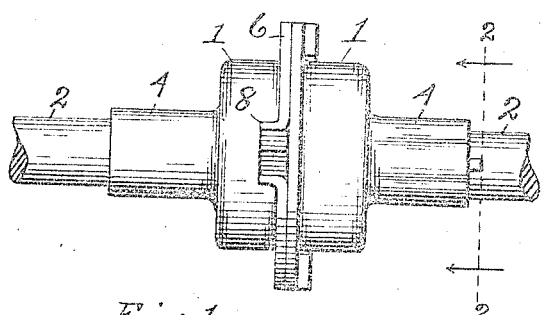
Fig. 1.
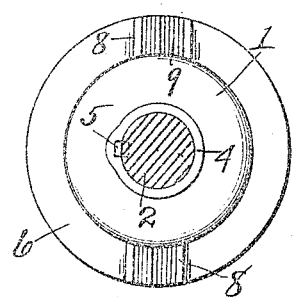
Fig. 2.
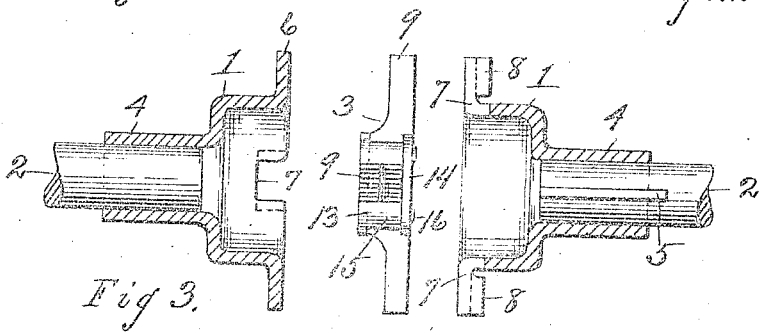
Fig. 3.
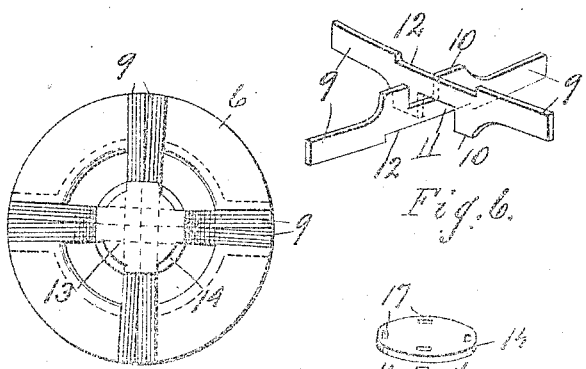
Fig. 4.
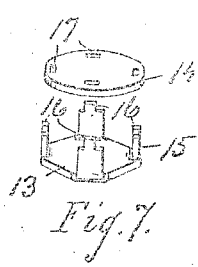
Fig. 7.
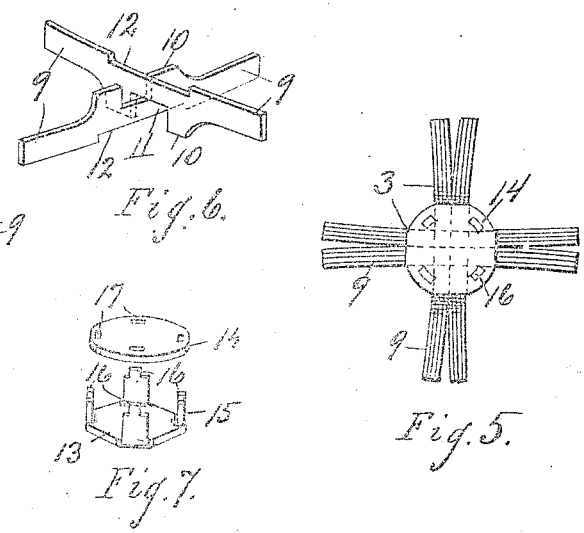
Fig. 5.
Fig. 6.
WITNESSES:
O. B. Baenziger
M. E. Bresamle
INVENTOR
Edward J. Madden
BY
B. P. Wheeler
ATTORNEY

UNITED STATES PATENT OFFICE.

EDWARD J. MADDEN, OF DETROIT, MICHIGAN.

SHAFT-COUPLING.

1,146,727.

Specification of Letters Patent.  Patented July 13, 1915.

Application filed July 11, 1914. Serial No. 850,305.

*To all whom it may concern:*

Be it known that I, EDWARD J. MADDEN, a citizen of the United States, residing at Detroit, in the county of Wayne, State of Michigan, have invented certain new and useful Improvements in Shaft-Couplings; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to shaft couplings, and consists in the novel features of construction as hereinafter described and pointed out particularly in the claims.

The main object of the invention is to provide a coupling for connecting the ends of shafts for the purpose of transmitting the motion of one shaft to the other so as to provide a yieldable driving connection between the shafts in such manner as to insure a close fitting contact between the parts, to obviate liability of loss of motion, to compensate for wear between the contacting parts of the coupling, and also to enable the shafts to be properly coupled and insure a free and smooth running movement of the shafts even though they should not be in true axial alinement with each other.

The invention further contemplates such a construction of coupling as will enable the parts to be produced entirely from sheet metal stampings so as to obviate the necessity for machining the parts to insure a proper fit, and thereby simplify, lighten and reduce the cost of construction.

The principal features of the invention reside in the employment of a novelly constructed coupling cross for effecting a driving connection between the body coupling members to provide an expansible driving contact between said members in a manner to attain a close contact between the driving parts so as to take up lost motion or backlash, that otherwise would result from wear between the working parts, and also enabling the parts of the coupling to adjust themselves axially to accommodate any inaccuracy in the alinement of the shafts, thus insuring at all times the synchronous movement of shafts so coupled.

The preferred form of construction and arrangement of parts by which the above objects are attained is illustrated in the accompanying drawings, in which:

Figure 1 is a side elevation of the coupling as it would appear attached to the ends of a two-piece shaft for coupling the members together. Fig. 2 is a cross-sectional view through one of the shafts on dotted line 2—2 of Fig. 1, showing the coupling in end elevation. Fig. 3 is a central longitudinal section through the coupling members detached, showing in elevation the spider or coupling cross for connecting the coupling members. Fig. 4 is a front elevation of one of the coupling members with the spider or coupling cross in position therein. Fig. 5 is an elevation of the spider or coupling cross detached. Fig. 6 is a perspective view of two of a plurality of plates of which the coupling cross is composed. Fig. 7 is a perspective view of the members of a housing or hub for binding the plates of the coupling cross together.

This coupling as a whole consists of three parts, namely, two hollow coupling heads 1 which are substantially alike and adapted each for attachment to one end each of a two-piece shaft 2 to be coupled, and interposed between these coupling heads is a spider or coupling cross 3 adapted to effect a driving connection between the coupling heads. Each of the heads 1 is preferably formed by stamping to shape from sheet metal and is provided at one side with a concentrically formed laterally projecting sleeve 4 adapted for attachment to the end of the shaft 2 by the usual key 5, or other suitable means, to effect a rigid connection. The metal at the inner or open ends of the heads 1 is turned outwardly at right-angles to the body portion in the form of laterally projecting circumferential flanges 6. Formed through the faces of these flanges diametrically of the heads and extending well into the body thereof are notches or ways 7 in which portions of the flanges 6 upon opposite sides of the ways 7 are turned inwardly at right-angles in the form of bearing shoulders 8, by means of which the bearing surfaces upon opposite sides of the notches or ways 7 are increased in area to include in addition to the thickness or gage of the metal the entire width of the face of the flange, as clearly shown in Figs. 1 and 3. The coupling heads thus constructed are disposed upon the ends of the shaft 3 to be coupled in opposed relation to each other with the notches or ways 7 of one head in a plane at right-angles to the corresponding ways of the other head, and with the faces of the flanges adapted to abut each other.

The spider or coupling cross 3, which is interposed between and engaged with the opposed ways 7 of the coupling heads 1 is composed of a plurality of relatively thin sheet metal plates 9, as shown in Fig. 5. Each of these plates (see Fig. 6) is provided with a centrally off-set body or hub portion 10 extending from one edge thereof in the plane of the body of the plate, and extending centrally into said hub portion is a notch 11 which terminates on a line with the edge of the plate from which the hub portion 10 projects. The opposite edge of each plate 9 is provided with a relatively shallow central recess 12. These plates are slightly dished or curved longitudinally and are nested together in groups of any suitable number, preferably four, and combined in pairs of groups with the crowning surfaces of the groups of each pair opposed to each other (see Fig. 5). Two of the pairs of plates 9 thus grouped and combined are halved together at their centers and at right-angles to each other by placing the notches 11 of one group or pair with the corresponding notches of the opposed pair, in which position the plates of one pair will off-set the plates of the opposite pair a distance equal to the width of the major portion of the plates. In this position the plates are firmly bound together at their centers by means of a two-piece housing comprising a cup-shaped body member 13 and a binding plate 14, shown in Fig. 7. Said body member is provided with up-turned or right-angled projections 15 at its periphery spaced in diametrically opposite relation to each other, and between which the pairs of plates forming the coupling cross 3 extend. The upper ends of the projections 15 are reduced to form riveting tongues 16 thereon that extend through correspondingly formed apertures 17 in the binding plate 14, and which are riveted over to bind said plate thereon within the recess 12 of one pair of plates 9 upon one side, while the body portion 13 of the housing is drawn into position within the recesses 12 of the other pair of opposed plates upon the opposite side of said coupling cross, whereby the parts are firmly bound together in a centrally formed hub from which the pairs of plates radiate in the manner of spokes or arms spaced equi-distant. Each arm comprises two groups of plates in which the outer ends of each pair of groups normally diverge from each other and occupy an area slightly greater than the area of the diametric ways 7 in the coupling heads in which they are to be seated. The coupling cross 2 thus constructed is interposed between the coupling heads 1. The ends of the groups of plates 9 forming the arms of one side are seated in the ways 7 of one of the coupling heads by compressing the deflected ends toward each other sufficiently to enable them to be entered therein, and the ends of the arms upon the opposite side of the coupling cross are similarly seated in the corresponding ways of the opposite coupling head, as clearly shown in Fig. 1. It will be apparent that in this manner of constructing the arms of the coupling cross, wherein a plurality of curved plates are combined in pairs with their crowning surfaces opposed to each other, each half of each arm is trussed and braced longitudinally throughout its major portion by its companion half; and that the free ends of the plates constituting said arms being deflected in opposite directions exert a spreading or expanding engagement between the opposite sides of the ways of the coupling heads in which they are seated, thereby insuring at all times a close fitting working contact which, while preventing any relative rotary movement between the coupling heads, affords a sufficiently yieldable driving engagement to allow the necessary lateral movement of the coupling members upon the arms of the coupling cross so as to adjust themselves axially to compensate for variations in the alinement of the shafts so coupled.

Having thus fully set forth my invention, what I claim as new, and desire to secure by Letters Patent, is:—

1. A shaft coupling comprising two coupling heads provided with means for attachment to the end of a shaft and having a way formed diametrically in the face thereof, said heads being opposed to each other with the way of one head disposed in a plane at right-angles to the way of the opposite head, an intermediate coupling member composed of a plurality of relatively thin curved plates nested together in groups and combined in reversely crowning pairs secured upon each other at right-angles to form radial arms bound together at their centers and having the plates at their free ends deflected in opposite directions from the transverse centers of said arms, the ends of the plates of said arms being expansively seated within the corresponding ways of the opposed coupling heads.

2. A shaft coupling comprising two hollow flanged coupling heads each provided with a concentric sleeve for attachment to the end of a shaft and having a way extending diametrically through the flange and into the body of each of said heads, said heads being opposed to dispose the way of one head in a plane at right-angles to the way of the opposite head, an intermediate coupling member consisting of a plurality of relatively thin curved plates nested together in groups and combined in reversely crowning pairs crossed upon each other and joined at their centers to form radial arms expansive circumferentially at their outer ends and adapted to seat at opposite ends and upon opposite sides within the corresponding ways of said opposed heads.

3. A shaft coupling comprising two hollow coupling heads each having a peripheral flange and provided with a concentric sleeve for attachment to the end of a shaft, and having a way extending diametrically through the flange and into the body of each of said heads, said heads being opposed, with the way of one head disposed in a plane at right-angles to the way of the opposite head, an intermediate coupling member comprising a plurality of relatively thin curved metal plates nested together in groups and combined in reversely crowning pairs of groups with the free ends of each pair of groups deflected from each other, a second pair of grouped plates crossing said first pair at right-angles, and a hub member having a binding plate for confining said grouped plates centrally together, the free ends of one pair of grouped plates seated within the way of one of said heads and the free ends of the other of said pair of grouped plates seated within the way of the opposite coupling head.

In testimony whereof, I sign this specification in the presence of two witnesses.

EDWARD J. MADDEN.

Witnesses:
B. F. WHEELER,
M. E. BROESAMLE.